(12) United States Patent
Todd et al.

(10) Patent No.: US 7,276,466 B2
(45) Date of Patent: Oct. 2, 2007

(54) COMPOSITIONS AND METHODS FOR REDUCING THE VISCOSITY OF A FLUID

(75) Inventors: Bradley L. Todd, Duncan, OK (US); Billy F. Slabaugh, Marlow, OK (US); Trinidad Munoz, Jr., Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 230 days.

(21) Appl. No.: 10/650,101

(22) Filed: Aug. 26, 2003

(65) Prior Publication Data

US 2004/0214724 A1  Oct. 28, 2004

Related U.S. Application Data

(60) Continuation-in-part of application No. 10/254,268, filed on Sep. 25, 2002, now abandoned, which is a division of application No. 09/879,634, filed on Jun. 11, 2001, now Pat. No. 6,488,091.

(51) Int. Cl.
C09K 8/60 (2006.01)
E21B 43/26 (2006.01)

(52) U.S. Cl. ............ 507/260; 166/278; 166/300; 166/308.1; 507/211; 507/214; 507/216; 507/224; 507/225; 507/230; 507/271

(58) Field of Classification Search ............ None
See application file for complete search history.

(56) References Cited

U.S. PATENT DOCUMENTS

| | | | |
|---|---|---|---|
| 2,238,671 A | 4/1941 | Woodhouse | 166/21 |
| 2,703,316 A | 3/1955 | Palmer | 260/78.3 |
| 3,173,484 A | 3/1965 | Huitt et al. | 166/280.1 |
| 3,195,635 A | 7/1965 | Fast | 166/280.1 |
| 3,272,650 A | 9/1966 | MacVittie | 134/7 |
| 3,302,719 A | 2/1967 | Fischer | 166/280.2 |
| 3,364,995 A | 1/1968 | Atkins et al. | 166/280.1 |
| 3,366,178 A | 1/1968 | Malone et al. | 166/280.1 |
| 3,455,390 A | 7/1969 | Gallus | 166/295 |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,868,998 A | 3/1975 | Lybarger et al. | 166/278 |
| 3,912,692 A | 10/1975 | Casey et al. | 260/78.3 |
| 3,948,672 A | 4/1976 | Harnsberger | 106/90 |
| 3,955,993 A | 5/1976 | Curtice | 106/90 |
| 3,960,736 A | 6/1976 | Free et al. | 252/8.55 R |
| 3,968,840 A | 7/1976 | Tate | 166/280.1 |
| 3,998,272 A | 12/1976 | Maly | 166/281 |
| 3,998,744 A | 12/1976 | Arnold et al. | 507/269 |
| 4,068,718 A | 1/1978 | Cooke, Jr. et al. | 166/280.2 |
| 4,169,798 A | 10/1979 | DeMartino | 252/8.55 R |
| 4,172,066 A | 10/1979 | Zweigle et al. | 260/29.6 TA |
| 4,261,421 A | 4/1981 | Watanabe | 166/281 |
| 4,387,769 A | 6/1983 | Erbstoesser et al. | 166/295 |
| 4,460,052 A | 7/1984 | Gockel | 175/72 |
| 4,470,915 A | 9/1984 | Conway | 252/8.55 R |
| 4,498,995 A | 2/1985 | Gockel | 252/8.5 LC |
| 4,526,695 A | 7/1985 | Erbstoesser et al. | 252/8.55 R |
| 4,694,905 A | 9/1987 | Armbruster | 166/280 |
| 4,715,967 A | 12/1987 | Bellis | 252/8.55 I |
| 4,716,964 A | 1/1988 | Erbstoesser et al. | 166/284 |
| 4,785,884 A | 11/1988 | Armbruster | 166/280 |
| 4,797,262 A | 1/1989 | Dewitz | 422/142 |
| 4,809,783 A | 3/1989 | Hollenbeck et al. | 166/307 |
| 4,817,721 A | 4/1989 | Pober | 166/295 |
| 4,843,118 A | 6/1989 | Lai et al. | 524/555 |
| 4,848,467 A | 7/1989 | Cantu et al. | 166/281 |
| 4,886,354 A | 12/1989 | Welch et al. | 356/70 |
| 4,957,165 A * | 9/1990 | Cantu et al. | 166/295 |
| 4,961,466 A | 10/1990 | Himes et al. | 166/250 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,067,566 A * | 11/1991 | Dawson | 166/308.5 |
| 5,082,056 A | 1/1992 | Tackett, Jr. | 166/295 |
| 5,142,023 A | 8/1992 | Gruber et al. | 528/354 |
| 5,216,050 A | 6/1993 | Sinclair | 524/108 |
| 5,224,546 A * | 7/1993 | Smith et al. | 166/300 |

(Continued)

FOREIGN PATENT DOCUMENTS

EP  0 879 935 A2  11/1998

(Continued)

OTHER PUBLICATIONS

Simmons, et al., "Poly(phenyllactide): Synthesis, Characterization, and Hydrolytic Degradation," Biomacromolecules, vol. 2, No. 3, 2001 (pp. 658-663).

(Continued)

Primary Examiner—Marc S. Zimmer
(74) Attorney, Agent, or Firm—Robert A. Kent; Baker Botts

(57) ABSTRACT

The present invention relates to improved methods and compositions for reducing the viscosity of subterranean servicing fluids where the servicing fluid has been cross-linked to increase its viscosity and that crosslinking can be reversed using a delayed release acid produced to reduce the fluid's pH.

13 Claims, No Drawings

U.S. PATENT DOCUMENTS

| | | | |
|---|---|---|---|
| 5,247,059 A | 9/1993 | Gruber et al. | 528/354 |
| 5,249,628 A | 10/1993 | Surjaatmadja | 166/305 |
| 5,295,542 A | 3/1994 | Cole et al. | 166/278 |
| 5,325,923 A | 7/1994 | Surjaatmadja et al. | 166/308 |
| 5,330,005 A | 7/1994 | Card et al. | 166/280 |
| 5,359,026 A | 10/1994 | Gruber | 528/354 |
| 5,360,068 A | 11/1994 | Sprunt et al. | 166/259 |
| 5,363,916 A * | 11/1994 | Himes et al. | 166/276 |
| 5,373,901 A | 12/1994 | Norman et al. | 166/300 |
| 5,386,874 A | 2/1995 | Laramay et al. | 166/300 |
| 5,396,957 A | 3/1995 | Surjaatmadja et al. | 166/308 |
| 5,402,846 A | 4/1995 | Jennings, Jr. et al. | 166/259 |
| 5,439,055 A | 8/1995 | Card et al. | 166/280 |
| 5,460,226 A | 10/1995 | Lawson et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/354 |
| 5,497,830 A | 3/1996 | Boles et al. | 166/300 |
| 5,499,678 A | 3/1996 | Surjaatmadja et al. | 166/298 |
| 5,505,787 A | 4/1996 | Yamaguchi | 134/4 |
| 5,512,071 A | 4/1996 | Yam et al. | 51/307 |
| 5,536,807 A | 7/1996 | Gruber et al. | 528/354 |
| 5,591,700 A | 1/1997 | Harris et al. | 507/204 |
| 5,594,095 A | 1/1997 | Gruber et al. | 528/354 |
| 5,604,186 A | 2/1997 | Hunt et al. | 507/204 |
| 5,607,905 A | 3/1997 | Dobson, Jr. et al. | 507/211 |
| 5,670,473 A | 9/1997 | Scepanski | 510/445 |
| 5,698,322 A | 12/1997 | Tsai et al. | 428/373 |
| 5,765,642 A | 6/1998 | Surjaatmadja | 166/297 |
| 5,791,415 A | 8/1998 | Nguyen et al. | 166/280 |
| 5,813,466 A * | 9/1998 | Harris et al. | 166/300 |
| 5,833,000 A | 11/1998 | Weaver et al. | 166/276 |
| 5,849,401 A | 12/1998 | El-Afandi et al. | 428/215 |
| 5,853,048 A | 12/1998 | Weaver et al. | 166/279 |
| 5,893,416 A | 4/1999 | Read | 166/304 |
| 5,908,073 A | 6/1999 | Nguyen et al. | 166/276 |
| 5,924,488 A | 7/1999 | Nguyen et al. | 166/280 |
| 5,964,291 A | 10/1999 | Bourne et al. | 166/279 |
| 6,004,400 A | 12/1999 | Bishop et al. | 134/2 |
| 6,024,170 A | 2/2000 | McCabe et al. | 166/300 |
| 6,028,113 A | 2/2000 | Scepanski | 514/643 |
| 6,047,772 A | 4/2000 | Weaver et al. | 166/276 |
| 6,114,410 A | 9/2000 | Betzold | 523/130 |
| 6,123,965 A | 9/2000 | Jacob et al. | 424/489 |
| 6,131,661 A | 10/2000 | Conner et al. | 166/300 |
| 6,135,987 A | 10/2000 | Tsai et al. | 604/365 |
| 6,143,698 A | 11/2000 | Murphey et al. | 507/145 |
| 6,162,766 A | 12/2000 | Muir et al. | 507/267 |
| 6,169,058 B1 | 1/2001 | Le et al. | 507/222 |
| 6,172,011 B1 | 1/2001 | Card et al. | 507/204 |
| 6,189,615 B1 | 2/2001 | Sydansk | 166/270 |
| 6,202,751 B1 | 3/2001 | Chatterji et al. | 166/276 |
| 6,209,643 B1 | 4/2001 | Nguyen et al. | 166/276 |
| 6,209,646 B1 | 4/2001 | Reddy et al. | 166/300 |
| 6,214,773 B1 | 4/2001 | Harris et al. | 507/271 |
| 6,242,390 B1 | 6/2001 | Mitchell et al. | 507/211 |
| 6,260,622 B1 | 7/2001 | Blok et al. | 166/305.1 |
| 6,311,773 B1 | 11/2001 | Todd et al. | 166/280 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,357,527 B1 | 3/2002 | Norman et al. | 166/300 |
| 6,364,945 B1 | 4/2002 | Chatterji et al. | 106/677 |
| 6,380,138 B1 | 4/2002 | Ischy et al. | 507/204 |
| 6,387,986 B1 | 5/2002 | Moradi-Araghi et al. | 523/211 |
| 6,390,195 B1 | 5/2002 | Nguyen et al. | 166/276 |
| 6,394,185 B1 | 5/2002 | Constien | 166/296 |
| 6,422,314 B1 | 7/2002 | Todd et al. | 166/312 |
| 6,454,003 B1 | 9/2002 | Chang et al. | 166/270 |
| 6,485,947 B1 | 11/2002 | Rajgarhia et al. | 435/139 |
| 6,488,763 B2 | 12/2002 | Brothers et al. | 106/692 |
| 6,494,263 B2 | 12/2002 | Todd | 166/312 |
| 6,508,305 B1 | 1/2003 | Brannon et al. | 166/293 |
| 6,527,051 B1 | 3/2003 | Reddy et al. | 166/300 |
| 6,554,071 B1 | 4/2003 | Reddy et al. | 166/293 |
| 6,569,814 B1 | 5/2003 | Brady et al. | 507/201 |
| 6,599,863 B1 | 7/2003 | Palmer et al. | 507/219 |
| 6,667,279 B1 | 12/2003 | Hessert et al. | 507/225 |
| 6,669,771 B2 | 12/2003 | Tokiwa et al. | 106/162 |
| 6,681,856 B1 | 1/2004 | Chatterji et al. | 166/294 |
| 6,686,328 B1 | 2/2004 | Binder | 510/446 |
| 6,702,023 B1 | 3/2004 | Harris et al. | 166/307 |
| 6,710,019 B1 | 3/2004 | Sawdon et al. | 507/136 |
| 6,761,218 B2 | 7/2004 | Nguyen et al. | 166/278 |
| 6,763,888 B1 | 7/2004 | Harris et al. | 166/305.1 |
| 6,793,018 B2 * | 9/2004 | Dawson et al. | 166/300 |
| 6,817,414 B2 | 11/2004 | Lee | 166/278 |
| 6,896,058 B2 | 5/2005 | Munoz, Jr. et al. | 166/279 |
| 6,949,491 B2 | 9/2005 | Cooke, Jr. | 507/219 |
| 2001/0016562 A1 | 8/2001 | Muir et al. | 507/201 |
| 2002/0036088 A1 | 3/2002 | Todd | 166/300 |
| 2002/0125012 A1 | 9/2002 | Dawson et al. | 166/300 |
| 2003/0060374 A1 | 3/2003 | Cooke, Jr. | 507/200 |
| 2003/0114314 A1 | 6/2003 | Ballard et al. | 507/100 |
| 2003/0130133 A1 | 7/2003 | Vallmer | 507/100 |
| 2003/0188766 A1 | 10/2003 | Banerjee et al. | 134/7 |
| 2003/0234103 A1 | 12/2003 | Lee et al. | 166/293 |
| 2004/0014607 A1 | 1/2004 | Sinclair et al. | 507/200 |
| 2004/0040706 A1 | 3/2004 | Hossaini et al. | 166/278 |
| 2004/0055747 A1 | 3/2004 | Lee | 166/278 |
| 2004/0094300 A1 | 5/2004 | Sullivan et al. | 166/308.1 |
| 2004/0106525 A1 | 6/2004 | Willbert et al. | 507/200 |
| 2004/0138068 A1 | 7/2004 | Rimmer et al. | 507/100 |
| 2004/0152601 A1 * | 8/2004 | Still et al. | 507/100 |
| 2004/0152602 A1 | 8/2004 | Boles | 507/100 |
| 2004/0216876 A1 | 11/2004 | Lee | 166/280.1 |
| 2004/0231845 A1 | 11/2004 | Cooke, Jr. | 166/279 |
| 2004/0261993 A1 | 12/2004 | Nguyen | 166/276 |
| 2004/0261995 A1 | 12/2004 | Nguyen et al. | 166/279 |
| 2004/0261996 A1 | 12/2004 | Munoz, Jr. et al. | 166/279 |
| 2004/0261999 A1 | 12/2004 | Nguyen | 166/292 |
| 2005/0006095 A1 | 1/2005 | Justus et al. | 166/295 |
| 2005/0028976 A1 * | 2/2005 | Nguyen | 166/276 |
| 2005/0034865 A1 | 2/2005 | Todd et al. | 166/304 |
| 2005/0103496 A1 | 5/2005 | Todd et al. | 166/278 |
| 2005/0252659 A1 | 11/2005 | Sullivan et al. | 166/280.1 |
| 2005/0272613 A1 | 12/2005 | Cooke, Jr. | 507/219 |

FOREIGN PATENT DOCUMENTS

| | | |
|---|---|---|
| EP | 1 413 710 A1 | 4/2004 |
| WO | WO 02/12674 A1 | 2/2002 |
| WO | WO 2004/037946 A1 | 5/2004 |
| WO | WO 2004/038176 A1 | 5/2004 |

OTHER PUBLICATIONS

Yin, et al., "Preparation and Characterization of Substituted Polylactides," Am. Chem. Soc., vol. 32, No. 23, 1999 (pp. 7711-7718).

Yin, et al., "Synthesis and Properties of Polymers Derived form Substituted Lactic Acids," Am. Chem. Soc., Ch. 12, 2001 (pp. 147-159).

Cordes, et al., *Mechanism and Catalysis for Hydrolysis of Acetals, Ketals, and Other Esters*, Department of Chemistry, Indiana University, Bloomington, Indiana, Chemical Reviews, 1974, vol. 74, No. 5, pp. 581-603.

Todd, et al., *A Chemical "Trigger" Useful for Oilfield Applications*, Society of Petroleum Engineers, Inc., SPE 92709, Feb. 4, 2005.

* cited by examiner

COMPOSITIONS AND METHODS FOR REDUCING THE VISCOSITY OF A FLUID

CROSS-REFERENCE TO RELATED APPLICATIONS

This application is a continuation-in-part of U.S. application Ser. No. 10/254,268 filed on Sep. 25, 2002 now abandoned which was itself a divisional of U.S. application Ser. No. 09/879,634 filed on Jun. 11, 2001 and issued on Dec. 3, 2002 as U.S. Pat. No. 6,488,091.

BACKGROUND OF THE INVENTION

1. Field of the Invention

The present invention relates to methods and compositions for treating subterranean well formations, and more specifically, to improved methods and compositions for reducing the viscosity of subterranean servicing fluids where the servicing fluid has been crosslinked to increase its viscosity.

2. Description of the Prior Art

A variety of viscosified servicing fluids are used in subterranean applications, such as drilling fluids, fracturing fluids and gravel delivery fluids. Oftentimes, after the viscosified fluid has performed its desired task, it is necessary to reduce the viscosity so that the servicing fluid can be removed from the formation.

Fracturing operations commonly employ viscosified fluids to suspend propping particles. Fracturing generally involves pumping a viscous fracturing fluid into a subterranean formation at sufficient hydraulic pressure to create one or more cracks or "fractures." The fracturing fluid must generally be viscous enough to suspend proppant particles that are placed in the fractures to hold the fracture open once the hydraulic pressure is released. Once at least one fracture is created and the proppant is substantially in place, the viscosity of the fracturing fluid is reduced and it is removed from the formation.

Similarly, sand control operations, such as gravel packing, use viscosified transport fluids to suspend gravel particles for delivery to an area in a well bore with unconsolidated or weakly consolidated particulates. One common type of gravel packing operation involves placing a gravel pack screen in the well bore and packing the annulus between the screen and the well bore with gravel of a specific size designed to prevent the passage of formation sand. The gravel pack screen is generally a filter assembly used to retain the gravel placed during gravel pack operation. A wide range of sizes and screen configurations are available to suit the characteristics of the gravel pack sand used. Similarly, a wide range of sizes of gravel is available to suit the characteristics of the unconsolidated or poorly consolidated particulates in the subterranean formation. The resulting structure presents a barrier to migrating sand from the formation while still permitting fluid flow. When installing the gravel pack, the gravel is carried to the formation in the form of a slurry by mixing the gravel with a transport fluid. Gravel packs act, inter alia, to stabilize the formation while causing minimal impairment to well productivity. The gravel, inter alia, acts to prevent the particulates from occluding the screen or migrating with the produced fluids, and the screen, inter alia, acts to prevent the gravel from entering the production tubing. Once the gravel pack is substantially in place, the viscosity of the transport fluid is reduced to allow it to be efficiently removed from the well bore.

Often, the viscosity of a servicing fluid is related to that fluid's pH. Thus, viscosity-reducing agents that reduce the pH of the servicing fluid may be added to reduce the viscosity of the fluid. To achieve that goal, gelled and cross-linked servicing fluids typically include internal delayed viscosity reducers such enzyme, oxidizing, acid, or temperature-activated viscosity reducers. However, these viscosity reducers may result in incomplete or premature viscosity reduction. Premature viscosity reduction can decrease the number and/or length of the fractures, and thus, can decrease the sought-after production-enhancing effects. Similarly, premature viscosity reduction of a gravel pack transport fluid may result in improper placement of the pack or insufficient packing of the gravel.

As an alternative to adding a viscosity-reducing agent to the servicing fluid, viscosity reduction may also be accomplished under the effect of time and temperature, as the viscosity of most servicing fluids will reduce naturally if given enough time and at a sufficient temperature. However, it is highly desirable to return the well back to production as quickly as possible and waiting for the viscosity of a servicing fluid to naturally decrease over time is generally unacceptable.

SUMMARY OF THE INVENTION

The present invention relates to methods and compositions for treating subterranean well formations, and more specifically, to improved methods and compositions for reducing the viscosity of subterranean servicing fluids where the servicing fluid has been cross-linked to increase its viscosity.

One embodiment of the present invention provides a method of reducing the pH of a servicing fluid comprising the steps of providing a crosslinked, viscous servicing fluid; adding an acid-releasing degradable material to the servicing fluid; allowing the acid-releasing degradable material to produce an acid; and allowing the servicing fluid's pH to reduce.

Another embodiment of the present invention provides a servicing fluid composition comprising a crosslinked, viscous fracturing fluid and an acid-releasing degradable material.

The objects, features and advantages of the present invention will be readily apparent to those skilled in the art upon a reading of the description of the preferred embodiments which follows.

DESCRIPTION OF PREFERRED EMBODIMENTS

The present invention relates to methods and compositions for treating subterranean well formations, and more specifically, to improved methods and compositions for reducing the viscosity of subterranean servicing fluids where the servicing fluid has been cross-linked to increase its viscosity.

The compositions of the present invention comprise acid-releasing degradable materials that react over time to produce an acid. In certain embodiments, the acid-releasing degradable materials of the present invention are added to a cross-linked servicing fluid that undergoes a reduction in viscosity when its pH is lowered. Moreover, in some embodiments the acid-releasing degradable materials act at a delayed rate to produce an acid and, in turn, cause a controlled reduction of the viscosity of the servicing fluid.

Any cross-linked servicing fluid that experiences a reduction in viscosity when its pH is lowered is suitable for use in the methods of the present invention, including aqueous gels and emulsions. Suitable aqueous gels are generally comprised of water and one or more gelling agents, while suitable emulsions are generally comprised of two immiscible liquids such as an aqueous gelled liquid and a liquefied, normally gaseous, fluid such as nitrogen.

A variety of viscosifying agents can be used, including hydratable polymers that contain one or more functional groups such as hydroxyl, cis-hydroxyl, carboxyl, sulfate, sulfonate, amino or amide. Particularly useful are polysaccharides and derivatives thereof that contain one or more of the monosaccharide units galactose, mannose, glucoside, glucose, xylose, arabinose, fructose, glucuronic acid or pyranosyl sulfate. Examples of natural hydratable polymers containing the foregoing functional groups and units that are particularly useful in accordance with the present invention include guar gum and derivatives thereof such as hydroxypropyl guar and cellulose derivatives, such as hydroxyethyl cellulose. Hydratable synthetic polymers and copolymers that contain the above-mentioned functional groups can also be used. Examples of such synthetic polymers include, but are not limited to, polyacrylate, polymethacrylate, polyacrylamide, polyvinyl alcohol and polyvinylpyrrolidone. The viscosifying agent used is generally combined with the water in the fracturing fluid in an amount in the range of from about 0.01% to about 2% by weight of the water.

Cross-linking agents may be used to further increase the viscosity of a servicing fluid. Examples of such cross-linking agents include but are not limited to alkali metal borates, borax, boric acid, and compounds that are capable of releasing multivalent metal ions in aqueous solutions. Examples of the multivalent metal ions are chromium, zirconium, antimony, titanium, iron, zinc or aluminum. When used, the cross-linking agent is generally added to the gelled water in an amount in the range of from about 0.01% to about 5% by weight of the water.

When the acid-releasing degradable materials of the present invention are used with servicing fluids that are de-linked in the presence of acid, such as those described in U.S. application Ser. No. 10/254,268, the relevant disclosure of which is herein incorporated by reference, the treating fluid becomes non-crosslinked below a defined pH and yet the acetal linkages which form the crosslinking sites are stable and can be re-crosslinked. In that case, not only can the servicing fluid be recovered from a treated subterranean formation by lowering its pH in accordance with the present invention, it can later be reused. Examples of crosslinkers that break down under reduced pH conditions include, but are not limited to, boric acid, disodium octaborate tetrahydrate, sodium diborate and pentaborates, ulexite and colemanite, compounds that can supply zirconium IV ions (such as, for example, zirconium lactate, zirconium lactate triethanolamine, zirconium carbonate, zirconium acetylacetonate, and zirconium diisoproplyamine lactate), and compounds that can supply titanium IV ions (such as, for example, titanium ammonium lactate, titanium triethanolamine, titanium acetylacetonate), aluminum compounds that can supply aluminum ions (such as, for example, alumimum citrate or aluminum lactate). In some embodiments of the present invention, a pH of less than about 9 is sufficiently low to cause the servicing fluid to become non-crosslinked and thus effect a reduction in the fluid's viscosity.

Acid-releasing degradable materials that may be used in conjunction with the present invention are those materials that are substantially water insoluble such that they degrade over time, rather than instantaneously, in an aqueous environment to produce an acid. Examples of suitable acid-releasing degradable materials include lactides, poly(lactides) and substituted poly (lactides) wherein the substituents include hydrogen, alkyl, aryl, alkylaryl, acetyl, heteroatoms and mixtures thereof, glycolides; poly(glycolides); substantially water insoluble anhydrides; and poly (anhydrides).

Materials suitable for use as an acid-releasing degradable material of the present invention may be considered degradable if the degradation is due, inter alia, to chemical and/or radical process such as hydrolysis, oxidation, or enzymatic decomposition. The degradability of a material depends at least in part on its molecular structure, type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the material is subjected may affect how it degrades, e.g., temperature, presence of water, oxygen, microorganisms, enzymes, pH, and the like.

Blends of certain acid-releasing degradable materials may also be suitable. One example of a suitable blend of materials includes a blend of lactide and poly(lactic acid).

In choosing the appropriate acid-releasing degradable material, one should consider the degradation products that will result. Also, these degradation products should not adversely affect other operations or components. The choice of degradable material also can depend, at least in part, on the conditions of the well, e.g., well bore temperature. For instance, lactides have been found to be suitable for lower temperature wells, including those within the range of 60° F. to 150° F., and polylactide have been found to be suitable for well bore temperatures above this range. Generally, smaller molecule acid-releasing degradable materials are suitable for use in lower temperature application and larger molecule acid-releasing degradable materials are suitable for use in higher-temperature applications. It is within the ability of one skilled in the art, with the benefit of this disclosure, to select a suitable acid-releasing degradable material.

The acid-releasing degradable materials suitable for use in the present invention may be added directly to the servicing fluid or, alternatively, they may be dissolved into a separate solvent before combination with a servicing fluid. In some embodiments of the present invention, particularly those involving subterranean formations having temperatures above about 250° F., it may be desirable to combine the acid-releasing degradable material with a solvent. Suitable such solvents include, but are not limited to acetone, propylene carbonate, dipropylglycolmethylether, methylene chloride, isopropyl alcohol, and combinations thereof.

When used in the present invention, a preferable result is achieved if the degradable material degrades slowly over time as opposed to instantaneously. Even more preferable results have been obtained when the degradable material does not begin to degrade until after the subterranean treatment, such as a fracturing operation, has been substantially completed.

It is within the ability of one skilled in the art, with the benefit of this disclosure, to consider the cross-linking agent used to increase the servicing fluid's viscosity and the acid-releasing degradable material chosen and determine the amount of acid-releasing degradable material needed to substantially de-link the servicing fluid.

In some embodiments of methods of the present invention, an acid-releasing degradable material that releases an acid over time is combined with a fracturing fluid that is used to fracture a subterranean formation. After a desired degree of fracturing, the pH of the fracturing fluid is reduced to a level that causes a reduction in the viscosity of the fracturing fluid.

In other embodiments of methods of the present invention, an acid-releasing degradable material that releasing an acid over time is combined with a gravel pack transport fluid that is used to deliver gravel particles into a well bore to create a gravel pack. After the gravel pack is substantially in place, the pH of the delivery fluid is reduced to a level that causes a reduction in the viscosity of the delivery fluid.

To facilitate a better understanding of the present invention, the following examples of preferred embodiments are given. In no way should the following examples be read to limit the scope of the invention.

EXAMPLES

Example 1

A one-liter sample of base gel was prepared by adding 155 cc of guar micropolymer concentrate to 845 cc of water. The base gel viscosity was found to be 12.65 cP at 75° F. A number of samples were prepared by mixing 250 cc of base gel, 0.7 cc of 25% NaOH solution, 120 g 20/40 fracturing sand, and 0.875 g borate crosslinker. Next, 1.25 g of lactide was added to each sample and the pH was monitored over time. The results of the test are shown in

TABLE 1

| Time (min) | pH without lactide | pH with 1.25 g lactide |
|---|---|---|
| 0 | 9.9 | 9.8 |
| 30 | 9.8 | 8.8 |
| 45 | 9.8 | 8.7 |
| 70 | 9.8 | 8.5 |
| 90 | 9.8 | 8.4 |
| 180 | 9.8 | 8.1 |

The uncrosslinking of the fluid will occur about a pH of 8.5, thus, Table 1 shows that lactide was able to provide the needed, controlled reduction of pH to uncrosslink the gel.

Example 2

A one-liter sample gel was prepared by adding 148 cc of guar micropolymer concentrate to 852 cc of water. The base gel viscosity was found to be 11.7 cP at 75° F. A number of samples were prepared by mixing 250 cc of base gel, 0.8 cc of 25% NaOH solution, 0.75 cc borate crosslinker solution, and 1 g lactide.

TABLE 1

| Time (min) | Viscosity (cP) |
|---|---|
| 10 | >2000 |
| 20 | 1270 |
| 30 | 810 |
| 40 | 610 |
| 50 | 190 |
| 60 | 105 |
| 70 | 55 |

Table 2 clearly shows that a lactide can be used to substantially lower the viscosity of the fracturing fluid in a relatively short amount of time.

Therefore, the present invention is well-adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of reducing the pH of a servicing fluid comprising:
    providing a crosslinked, viscous servicing fluid comprising an acid-releasing degradable material selected from the group consisting of lactides, poly(lactides), glycolides, poly(glycolides), substantially water-insoluble anhydrides, poly(anhydrides), derivatives thereof, and combinations thereof, wherein the acid-releasing degradable material further comprises a solvent selected from the group consisting of acetone, propylene carbonate, dipropylglycolmethylether, methylene chloride, isopropyl alcohol, and combinations thereof;
    allowing the acid-releasing degradable material to produce an acid; and
    allowing a pH of the servicing fluid to be reduced.

2. The method of claim 1 wherein the servicing fluid comprises a fracturing fluid or a gravel packing transport fluid.

3. The method of claim 1 wherein the servicing fluid is crosslinked with a crosslinker selected from the group consisting of boric acid, disodium octaborate tetrahydrate, sodium diborate and pentaborates, ulexite, colemanite, zirconium lactate, zirconium lactate triethanolamine, zirconium carbonate, zirconium acetylacetonate, zirconium diisoproplyamine lactate, titanium ammonium lactate, titanium triethanolamine, titanium acetylacetonate, alumimum citrate, aluminum lactate, and combinations thereof.

4. The method of claim 1 wherein the servicing fluid de-crosslinks at a pH below about 9.

5. A method of fracturing a subterranean formation comprising:
    providing a crosslinked, viscous fracturing fluid comprising an acid-releasing degradable material selected from the group consisting of lactides, poly(lactides), glycolides, poly(glycolides), substantially water-insoluble anhydrides, poly(anhydrides), derivatives thereof, and combinations thereof, wherein the acid-releasing degradable material further comprises a solvent selected from the group consisting of acetone, propylene carbonate, dipropylglycolmethylether, methylene chloride, isopropyl alcohol, and combinations thereof;
    introducing the fracturing fluid into a subterranean formation at a pressure sufficient to create at least one fracture;
    allowing the acid-releasing degradable material to produce an acid;
    allowing a pH of the fracturing fluid to be reduced; and
    allowing a viscosity of the fracturing fluid to be reduced.

6. The method of claim 5 wherein the fracturing fluid is crosslinked with a crosslinker selected from the group consisting of boric acid, disodium octaborate tetrahydrate, sodium diborate and pentaborates, ulexite, colemanite, zirconium lactate, zirconium lactate triethanolamine, zirconium carbonate, zirconium acetylacetonate, zirconium diisoproplyamine lactate, titanium ammonium lactate, titanium triethanolamine, titanium acetylacetonate, alumimum citrate, aluminum lactate, and combinations thereof.

7. The method of claim 5 wherein the fracturing fluid de-crosslinks at a pH below about 9.

8. A method of creating a gravel pack in a well bore comprising:
 providing a crosslinked, viscous gravel transport fluid comprising gravel and an acid-releasing degradable material selected from the group consisting of lactides, poly(lactides), glycolides, poly(glycolides), substantially water-insoluble anhydrides, poly(anhydrides), derivatives thereof, and combinations thereof;
 introducing the gravel transport fluid into a portion of a well bore so as to create a gravel pack;
 allowing the acid-releasing degradable material to produce an acid;
 allowing a pH of the gravel transport fluid to be reduced; and
 allowing a viscosity of the gravel transport fluid to be reduced.

9. The method of claim 8 wherein the gravel transport fluid is crosslinked with a crosslinker selected from the group consisting of boric acid, disodium octaborate tetrahydrate, sodium diborate and pentaborates, ulexite, colemanite, zirconium lactate, zirconium lactate triethanolamine, zirconium carbonate, zirconium acetylacetonate, zirconium diisoproplyamine lactate, titanium ammonium lactate, titanium triethanolamine, titanium acetylacetonate, alumimum citrate, aluminum lactate, and combinations thereof.

10. The method of claim 8 wherein the gravel transport fluid de-crosslinks at a pH below about 9.

11. The method of claim 8 wherein the acid-releasing degradable material further comprises a solvent.

12. The method of claim 11 wherein the solvent is selected from the group consisting of acetone, propylene carbonate, dipropylglycolmethylether, methylene chloride, isopropyl alcohol, and combinations thereof.

13. A servicing fluid composition comprising
 a crosslinked, viscous fluid,
 an acid-releasing degradable material selected from the group consisting of lactides, poly(lactides), glycolides, poly(glycolides), substantially water-insoluble anhydrides, poly(anhydrides), derivatives thereof, and combinations thereof, and
 a solvent selected from the group consisting of acetone, propylene carbonate, dipropylglycolmethylether, methylene chloride, isopropyl alcohol, and combinations thereof.

* * * * *